United States Patent
Takashima

(10) Patent No.: US 11,011,314 B2
(45) Date of Patent: May 18, 2021

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Kenji Takashima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 88 days.

(21) Appl. No.: 16/417,276

(22) Filed: May 20, 2019

(65) Prior Publication Data

US 2019/0371528 A1     Dec. 5, 2019

(30) Foreign Application Priority Data

Jun. 1, 2018 (JP) .............................. JP2018-106421

(51) Int. Cl.
*H01G 4/30* (2006.01)
*H01G 4/012* (2006.01)
*H01G 4/12* (2006.01)
*H01G 4/228* (2006.01)

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC .......... H01G 4/30; H01G 4/228; H01G 4/012; H01G 4/12; H01G 4/232; H01G 4/224
See application file for complete search history.

(56) References Cited

U.S. PATENT DOCUMENTS

| | | | |
|---|---|---|---|
| 9,093,220 B1* | 7/2015 | Kitano | H01G 4/232 |
| 2007/0139861 A1 | 6/2007 | Nakano et al. | |
| 2014/0301013 A1* | 10/2014 | Kim | H01G 4/01 361/301.4 |
| 2017/0040111 A1* | 2/2017 | Kim | H01G 4/30 |
| 2017/0345567 A1* | 11/2017 | Sakate | H01G 4/005 |
| 2019/0115153 A1* | 4/2019 | Park | H01G 4/1209 |
| 2019/0259537 A1* | 8/2019 | Teraoka | H01G 4/1245 |
| 2019/0355517 A1* | 11/2019 | Chigira | H01G 4/30 |
| 2019/0355519 A1* | 11/2019 | Taniguchi | H01G 4/12 |
| 2019/0362897 A1* | 11/2019 | Kato | H01G 4/232 |

FOREIGN PATENT DOCUMENTS

| | | |
|---|---|---|
| JP | 2007123835 A | 5/2007 |
| WO | 2005050679 A1 | 6/2005 |

* cited by examiner

*Primary Examiner* — Nathan Milakovich
(74) *Attorney, Agent, or Firm* — Law Office of Katsuhiro Arai

(57) ABSTRACT

A ceramic electronic device includes: a multilayer structure having a parallelepiped shape in which each of dielectric layers and each of internal electrode layers are alternately stacked and are alternately exposed to two end faces; and a cover layer provided on at least one of an upper face and a lower face of the multilayer structure, a main component of the cover sheet being same as the main component of the plurality of dielectric layers, wherein tensile stress remains along a first direction on a surface of the cover layer, wherein the first direction is a direction in which the two end faces face with each other, wherein the tensile stress on a center side in a second direction is larger than the tensile stress on the two side faces side, wherein the second direction is a direction in which the two side faces face with each other.

6 Claims, 10 Drawing Sheets

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2018-106421, filed on Jun. 1, 2018, the entire contents of which are incorporated herein by reference.

FIELD

A certain aspect of the present invention relates to a multilayer ceramic capacitor and a manufacturing method of the multilayer ceramic capacitor.

BACKGROUND

Downsizing, high performance, high reliability or the like is promoted with respect electronic devices. Therefore, small or thin type product having a high electrostatic capacity is developed with respect to multilayer ceramic capacitors. And so, there is disclosed a technology in which a high dielectric constant is achieved by remaining stress in a capacitor (for example, see International Publication No. 2005/050679). And there is disclosed a technology in which a high capacity is achieved by forming a curve in a side portion and remaining compressive stress in the side portion (for example, see Japanese Patent Application Publication No. 2007-123835).

SUMMARY OF THE INVENTION

The present invention has a purpose of providing a multilayer ceramic capacitor and a manufacturing method of the multilayer ceramic capacitor that are capable of achieving resistance against thermal shock and achieving a high capacity.

According to an aspect of the present invention, there is provided a multilayer ceramic capacitor comprising: a multilayer structure having a parallelepiped shape in which each of a plurality of dielectric layers and each of a plurality of internal electrode layers are alternately stacked and are alternately exposed to two end faces of the multilayer structure, a main component of the plurality of dielectric layers being a ceramic; and a cover layer provided on at least one of an upper face and a lower face in a stacking direction of the multilayer structure, a main component of the cover sheet being same as the main component of the plurality of dielectric layers, wherein tensile stress remains along a first direction on a surface of the cover layer, wherein the first direction is a direction in which the two end faces face with each other, wherein the tensile stress on a center side in a second direction is larger than the tensile stress on the two side faces side, wherein the second direction is a direction in which the two side faces face with each other.

According to another aspect of the present invention, there is provided a manufacturing method of a multilayer ceramic capacitor comprising: a first process of providing an internal electrode layer pattern of metal conductive paste, on a green sheet including main component ceramic grains; a second process of providing a cover sheet including main component ceramic grains, on at least one of an upper face and a lower face in a stacking direction of a ceramic multilayer structure in which a plurality of stack units obtained by the first process are stacked so that the internal electrode layer patterns are alternately shifted to each other; and a third process of providing a side margin sheet on a side face of the ceramic multilayer structure to which the internal electrode layer patterns are exposed, the side margin sheet including main component ceramic grains; and a fourth process of firing the multilayer structure and the side margin sheet, wherein materials of the green sheet, the side margin sheet and the cover sheet are adjusted so that contraction amounts caused by sintering of the firing have a relationship of "the cover sheet>the side margin sheet>the green sheet" with respect to the main component ceramic of the green sheet, the side margin sheet and the cover sheet.

According to another aspect of the present invention, there is provided a multilayer ceramic capacitor including: a multilayer structure having a parallelepiped shape in which each of a plurality of dielectric layers and each of a plurality of internal electrode layers are alternately stacked and are alternately exposed to two end faces of the multilayer structure, a main component of the plurality of dielectric layers being a ceramic; and a cover layer provided on at least one of an upper face and a lower face in a stacking direction of the multilayer structure, a main component of the cover sheet being same as the main component of the plurality of dielectric layers, wherein when a laser light which is polarized toward a first direction is radiated to a surface of the cover layer and a spectrum of Raman scattering light is measured, a first peak position of an A oscillation measured on a center side of a second direction is shifted to a minus side with respect to 260 $cm^{-1}$ and a second peak position of an A oscillation measured on a side face side in the second direction is shifted to a plus side with respect to the first peak position, wherein the first direction is a direction in which the two end faces face with each other, wherein the second direction is a direction in which the two side faces face with each other.

DETAILED DESCRIPTION

However, a non-negligible micro structural defect occurs when thermal shock is added to the multilayer ceramic capacitor, in a case where the above-mentioned technologies are applied to a multilayer ceramic capacitor in which a thickness of a dielectric layer is reduced, and the number of stacking of the dielectric layer is increased. Therefore, open defect, short defect or external view defect may occur.

A description will be given of an embodiment with reference to the accompanying drawings.

Embodiment

Figure 1:
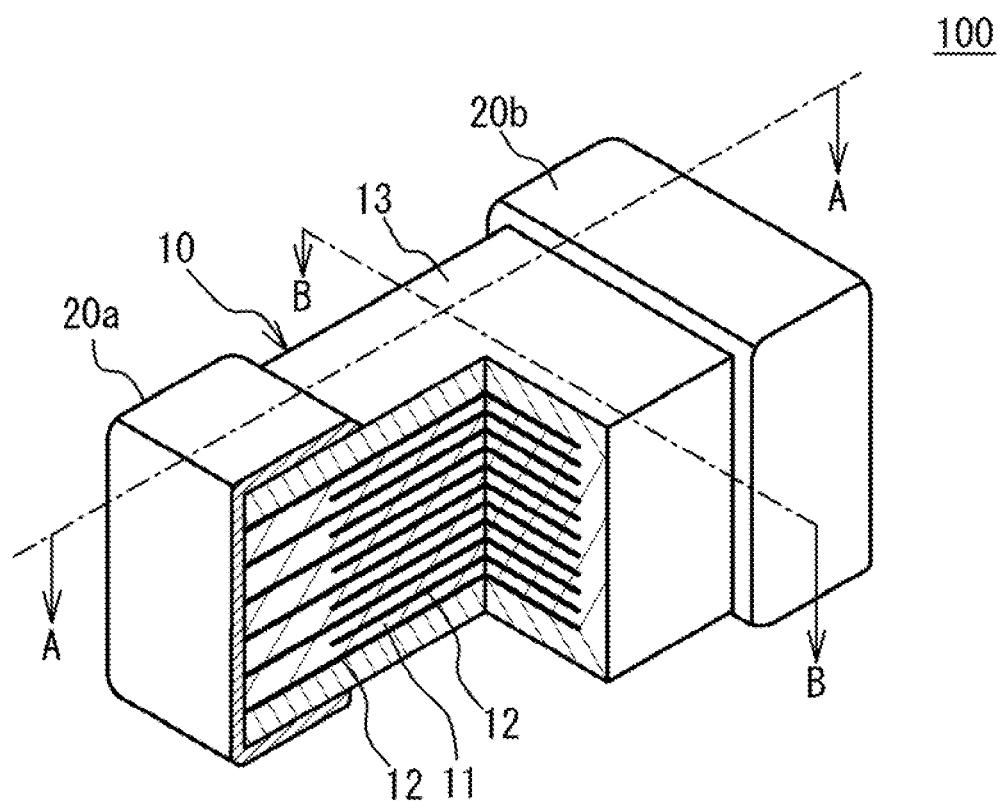
FIG. 1 illustrates a partial perspective view of a multilayer ceramic capacitor.
Figure 2:
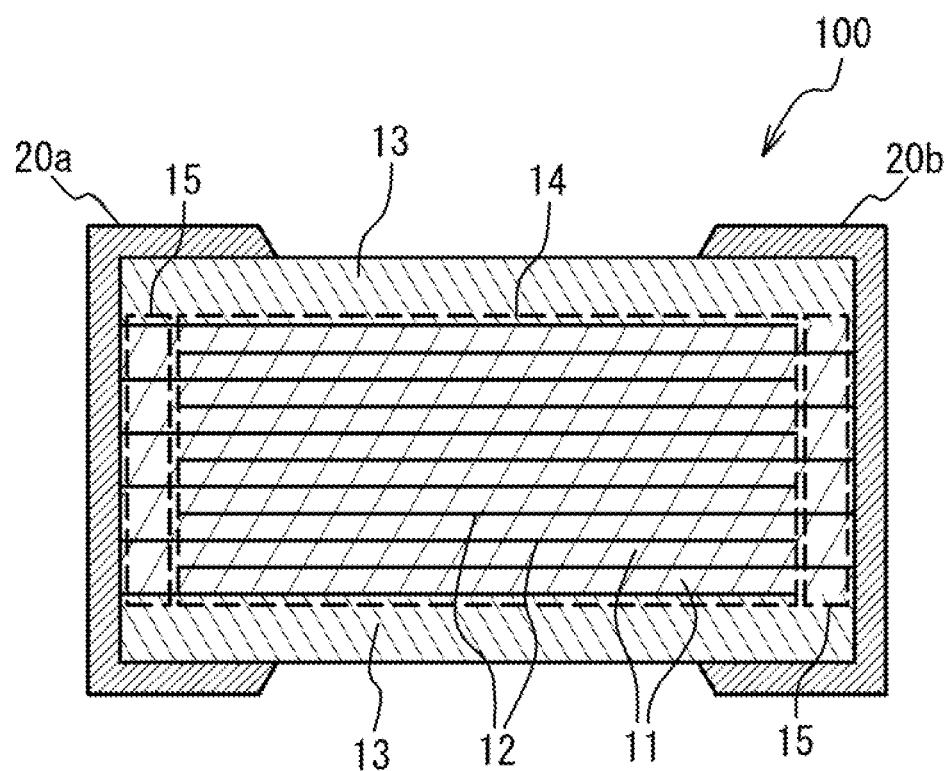
FIG. 2 illustrates a cross sectional view taken along a line A-A of FIG. 1.
Figure 3:
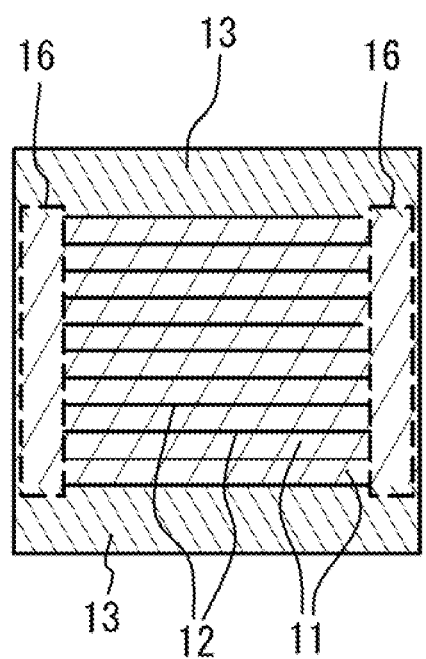
FIG. 3 illustrates a cross sectional view taken along a line B-B of FIG. 1.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have a plurality of dielectric layers 11 and a plurality of internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which the plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces.

Downsizing, high performance, high reliability or the like is promoted with respect electronic devices. Therefore, small or thin type product having a high electrostatic capacity is developed with respect to the multilayer ceramic capacitor. And so, it is thought that a high dielectric constant is achieved and a high capacity is achieved by remaining stress. However, a non-negligible micro structural defect occurs when thermal shock is added to the multilayer ceramic capacitor from environment, in a case where stress is remained in the multilayer capacitor in which the thickness of the dielectric layer is reduced and the number of stacking of the dielectric layer is increased in order to achieve a high capacity. Therefore, open defect, short defect or external view defect may occur. And so, the multilayer ceramic capacitor 100 of the embodiment has a structure having resistance against the thermal shock and achieving high capacity.

Figure 4:
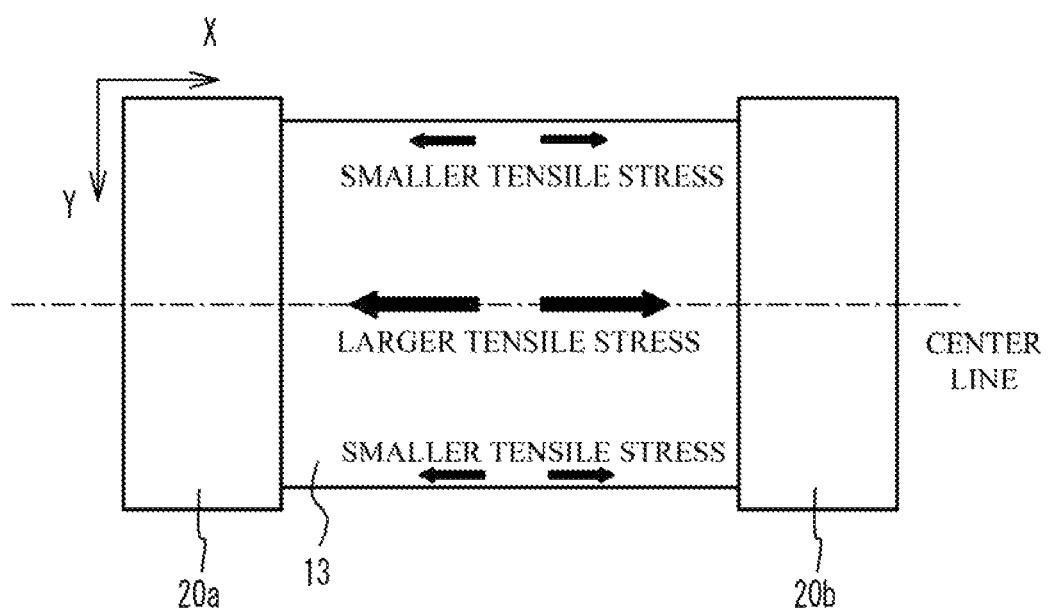
FIG. 4 illustrates a plan view of a multilayer ceramic capacitor seen from an upper side.

FIG. 4 illustrates a plan view of the multilayer ceramic capacitor 100 seen from an upper side. As illustrated in FIG. 4, a longitudinal direction (a direction in which the two end faces of the multilayer chip 10 face with each other) is an X-axis direction (first direction). A short direction (a direction in which the two side faces of the multilayer chip 10 faces with each other) is a Y-axis direction (second direction). In the multilayer ceramic capacitor 100, tensile stress remains along the X-axis direction, on the surface of at least one of the cover layers 13. When the tensile stress remains along the X-axis direction, the dielectric layer 11 has a high dielectric constant. When each of the dielectric layers 11 has a high dielectric constant, a high capacity is achieved. The tensile stress in the embodiment is force acting as reaction so as to oppose to external force added to stretch toward outside along the longitudinal direction.

The strength of the tensile stress remaining along the X-axis direction has distribution on the surface of the cover layer 13. In concrete, tensile stress on a center side in the Y-axis direction is larger than tensile stress of an end on the side face side in the Y-axis direction, on the surface of the cover layer 13. The side face portion of which the tensile stress is small can absorb thermal shock. It is therefore possible to suppress occurrence of a structural defect of the multilayer ceramic capacitor 100.

As mentioned above, in the multilayer ceramic capacitor 100 of the embodiment, the tensile stress remains in the X-axis direction in which the two end faces of the multilayer chip 10 faces with each other, on the surface of the cover layer 13. The tensile stress on the center side in the Y-axis direction in which the two side faces of the multilayer chip 10 face with each other is larger than the tensile stress of the ends on the two side faces side. It is therefore possible to achieve resistance against the thermal shock and achieve a high capacity. It is preferable that the strength of the tensile stress has distribution in both of the cover layers 13.

When the region in which the tensile stress remaining along the X-axis direction is large is wider, a higher capacity is achieved. It is therefore preferable that the tensile stress is the largest at a center in the Y-axis direction passing through the center of the X-axis direction. It is preferable that the tensile stress gradually gets smaller from the center of the Y-axis direction to the end of the side face side.

When the tensile stress remaining along the X-axis direction is not sufficiently large, it may not be necessarily possible to sufficiently enlarge the dielectric constant of the dielectric layer 11. And so, it is preferable that the maximum tensile stress has a lower limit. In concrete, it is preferable that a difference between the maximum value and the minimum value is 50 MPa or more in the Y-axis direction passing through the center in the X-axis direction, with respect to the tensile stress remaining along the X-axis direction. It is more preferable that the difference is 100 MPa or more. On the other hand, when the tensile stress remaining along the X-axis direction is excessively large, sufficient resistance against the thermal shock may not be necessarily achieved. And so, it is preferable that the maximum tensile stress has an upper limit. In concrete, it is preferable that the difference between the maximum value and the minimum value is 800 MPa or less in the Y-axis direction passing through the center in the X-axis direction, with respect to the tensile stress remaining along the X-axis direction. It is more preferable that the difference is 550 MPa or less.

The direction in which the tensile stress remaining on the surface of the cover layer 13 is maximum may be inclined with respect to the X-axis direction. In this case, the remaining tensile stress has an X-axis direction component. And the X-axis direction component on the center side in the Y-axis direction is larger than the X-axis direction component on the end of the side face side in the Y-axis direction.

In case where the direction in which the tensile stress remaining on the surface of the cover layer 13 is the largest is inclined with respect to the X-axis direction, it is preferable that the X-axis direction component is larger than the Y-axis direction component. This is because the force opposing to the deformation caused by the thermal expansion and thermal contraction gets away toward the Y-axis direction, and sufficient effect may not be necessarily achieved.

In particular, the embodiment has large effect with respect to the multilayer ceramic capacitor in which the thickness of the dielectric layer 11 and the internal electrode layer 12 are reduced. For example, the embodiment has large effect when an average thickness of the dielectric layer 11 is 0.5 μm or more and 0.6 μm or less, or an average thickness of the internal electrode layer 12 is 0.5 μm or more and 0.6 μm or less. The embodiment has larger effect when the average thickness of the dielectric layer 11 is 0.3 μm or more and 0.4 μm or less, or the average thickness of the internal electrode layer 12 is 0.2 μm or more and 0.3 μm or less.

Figure 5:
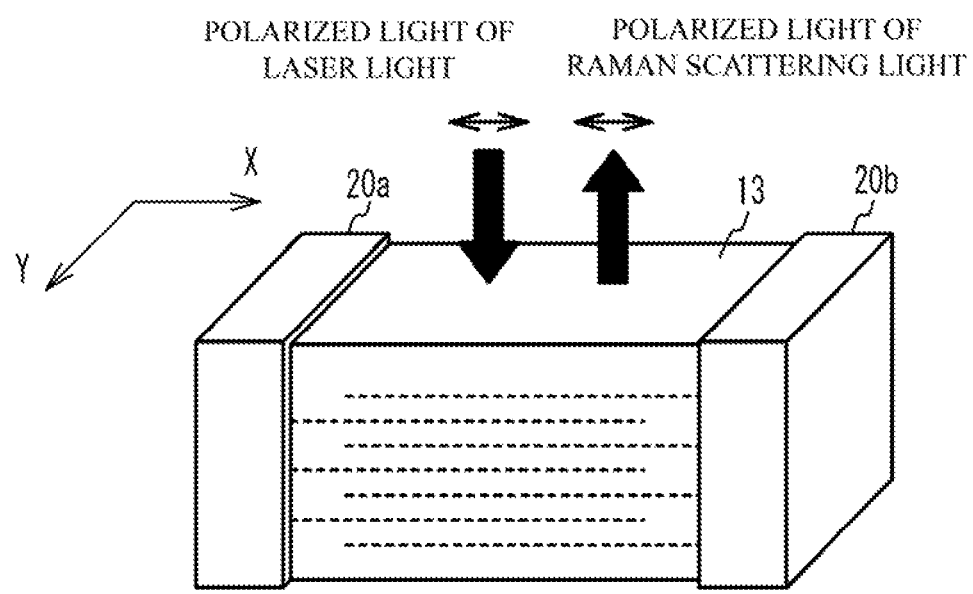
FIG. 5 illustrates a measurement method of tensile stress.
Figure 6:
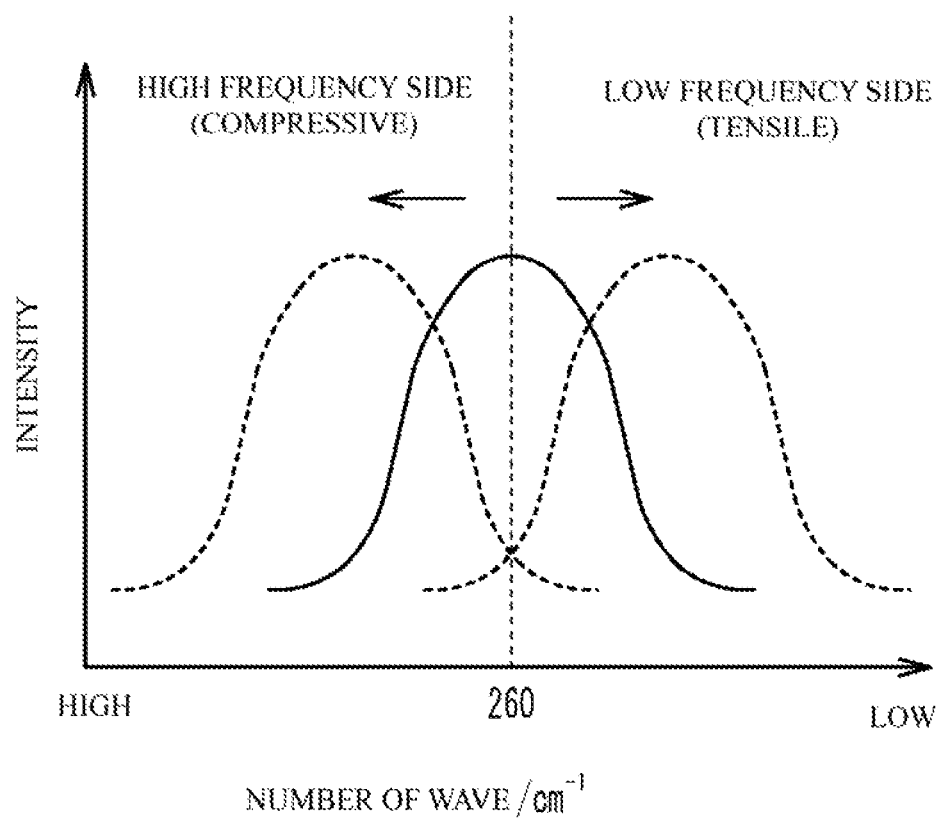
FIG. 6 illustrates a relationship between tensile stress and a peak.

Next, a description will be given of a measurement method of the tensile stress. As illustrated in FIG. 5, a laser light which is polarized toward the X-axis direction and has a spot diameter of approximately 1 μm, is radiated to the surface of the cover layer 13. Under the condition, a spectrum of Raman scattering light polarized toward the X-axis direction is measured. When the light polarized toward the X-axis direction is used, it is possible to estimate the remaining stress acting in the X-axis direction at a point to which the laser light is radiated. In this case, as illustrated in FIG. 6, a peak caused by A (1TO) oscillation appears near 260 $cm^{-1}$. When the tensile stress occurs, the peak position is shifted to the minus side (right side with respect to 260 $cm^{-1}$). When the compressive stress occurs, the peak position is shifted to the plus side (left side with respect to 260 $cm^{-1}$). A peak shift amount of 1 $cm^{-1}$ corresponds to approximately 25 MPa. Therefore, it is possible to measure the stress by measuring peak shift amount.

Figure 7:
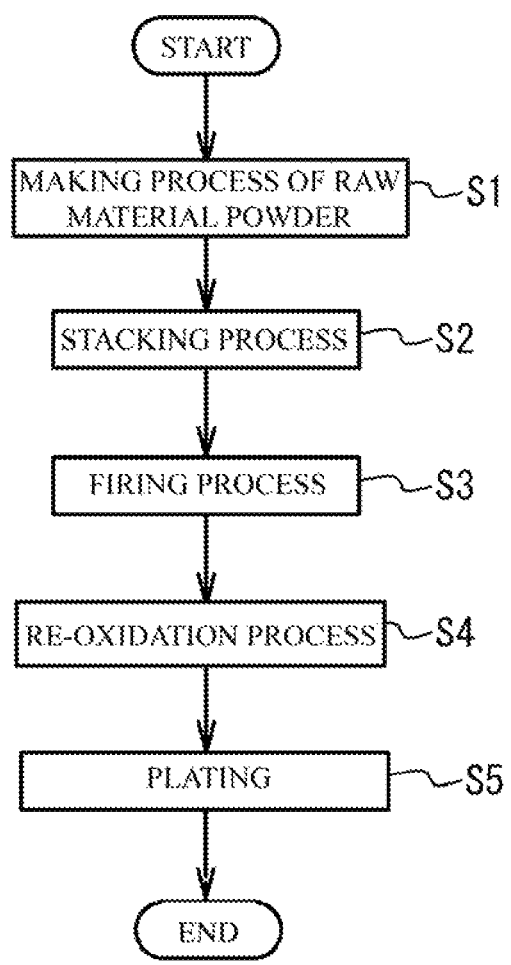
FIG. 7 illustrates a manufacturing method of a multilayer ceramic capacitor.

Next, a description will be given of a manufacturing method of the multilayer ceramic capacitor 100. FIG. 7 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. In the embodiment, any one of the methods can be used.

Additive compound may be added to the resulting ceramic material powder in accordance with purposes. The additive compound may be an oxide of Mn, V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si (silicon), or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives and are dried and crushed. Thus, a ceramic powder is obtained. For example, it is preferable that an average grain diameter of the resulting ceramic powders is 50 nm to 300 nm, from a view point of reduction of the thickness of the dielectric layer 11. For example, the grain diameter may be adjusted by crushing the resulting ceramic powder as needed. Alternatively, the grain diameter of the resulting ceramic power may be adjusted by combining the crushing and classifying.

Next, a side margin material for forming the side margin region 16 is prepared. An additive compound may be added to ceramic powders obtained by the same process as the dielectric material, in accordance with purposes. The additive compound may be an oxide of Mn, V, Cr or a rare earth element (Y, Sm, Eu, Gd, Tb, Dy, Ho, Er, Tm and Yb), or an oxide of Co, Ni, Li, B, Na, K and Si, or glass.

In the embodiment, it is preferable that ceramic particles structuring the side margin region 16 are mixed with compound including additives and are calcined in a temperature range from 820 degrees C. to 1150 degrees C. Next, the resulting ceramic particles are wet-blended with additives and are dried and crushed. Thus, ceramic powder is obtained. For example, it is preferable that an average grain diameter of the resulting ceramic powders is 50 nm to 300 nm. For example, the grain diameter may be adjusted by crushing the resulting ceramic powder as needed. Alternatively, the grain diameter of the resulting ceramic power may be adjusted by combining the crushing and classifying.

Next, a cover material for forming the cover layer 13 is prepared. An additive compound may be added to ceramic powders of barium titanate obtained by the same process as the dielectric material, in accordance with purposes. The additive compound may be an oxide of Mn, V, Cr or a rare earth element (Y, Sm, Eu, Gd, Tb, Dy, Ho, Er, Tm and Yb), or an oxide of Co, Ni, Li, B, Na, K and Si, or glass.

In the embodiment, it is preferable that ceramic particles structuring the cover layer 13 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm. The grain diameter may be adjusted by crushing the resulting ceramic powder as needed. Alternatively, the grain diameter of the resulting ceramic power may be adjusted by combining the crushing and classifying.

In the embodiment, the contraction amount in the sintering has a relationship of "the cover material>the side margin material>the dielectric material", with respect to the main component ceramic of the dielectric material, the side margin material and the cover material. For example, when the main component ceramic is identical with respect to the dielectric material, the side margin material and the cover material, a ratio (c/a ratio) of c-axis and a-axis of the main component ceramic has a relationship of "the cover material<the side margin material<the dielectric material". The amount of the sintering assistant added to each material may be adjusted.

(Stacking process) Next, a binder such as polyvinyl butyral (PVB) resin, an organic solvent such as ethanol or toluene, and a plasticizer are added to the resulting dielectric material and wet-blended. With use of the resulting slurry, a stripe-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The metal conductive paste includes an organic binder. A plurality of the patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, BaTiO$_3$ of which an average grain diameter is 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations.

Next, a binder such as polyvinyl butyral (PVB) resin, an organic solvent such as ethanol or toluene, and a plasticizer are added to the cover material and wet-blended. With use of the resulting slurry, a stripe-shaped cover sheet with a thickness of 10 μm or less is coated on a base material by, for example, a die coater method or a doctor blade method, and then dried. Cover sheets, which are to be the cover layers 13, are compressed on the stacked dielectric green sheets and under the stacked dielectric green sheets. The resulting multilayer structure is cut into a predetermined size (for example, 1.0 mm×0.5 mm). In this case, two end faces to which the patterns for forming the internal electrode layer are exposed every other one are formed. And, two side faces to which all of the patterns for forming the internal electrode layer are exposed are formed.

Next, a binder such as polyvinyl butyral (PVB) resin, an organic solvent such as ethanol or toluene, and a plasticizer are added to the side margin material and wet-blended. With use of the resulting slurry, a stripe-shaped side margin sheet with a thickness of 30 μm or less is coated on a base material by, for example, a die coater method or a doctor blade method, and then dried. The side margin sheet is affixed to the two side faces of the multilayer structure to which all of the patterns for forming the internal electrode layer are exposed. After that, the binder is removed in N$_2$ atmosphere of 250 degrees C. to 500 degrees C. Metal conductive paste to be the external electrodes 20a and 20b is coated on the both end faces of the multilayer structure by a dipping method and is dried. Thus, a compact of the multilayer ceramic capacitor 100 is obtained.

(Firing process) The resulting compact is fired for ten minutes to 2 hours in a reductive atmosphere, of which a partial pressure of oxygen is $10^{-5}$ atm to $10^{-8}$ atm, in a temperature range of 1100 degrees C. to 1300 degrees C. Thus, each compound is sintered. And each grain of the compound grows. In this manner, it is possible to manufacture the multilayer ceramic capacitor 100.

(Re-oxidizing process) After that, a re-oxidizing process may be performed in N$_2$ gas atmosphere in a temperature range of 600 degrees C. to 1000 degrees C.

(Plating process) After that, metal layers such as Cu, Ni or Sn may be coated on the external electrodes 20a and 20b by a plating.

In the manufacturing method of the embodiment, the contraction amount in the sintering has the relationship of "the cover material>the dielectric material", with respect to the main component ceramic of the dielectric material, the side margin material and the cover material. Therefore, the tensile stress remains along the X-axis direction acting as the longitudinal direction, on the surface of the cover layer 13 of the multilayer ceramic capacitor 100 after the firing. The contraction amount in the sintering has the relationship of "the cover material>the side margin material>the dielectric material", with respect to the main component ceramic of the dielectric material, the side margin material and the cover material. Therefore, the X-axis direction component of the tensile stress on the center side in the Y-axis direction is larger than the X-axis direction component of the tensile stress of the end of the side face side, on the surface of the cover layer 13 of the multilayer ceramic capacitor 100 after the firing. Accordingly, it is possible to achieve the resistance against the thermal shock and achieve the high capacity.

Example

The multilayer ceramic capacitors in accordance with the embodiment were made and the property was measured.

Ceramic powder of $BaTiO_3$ was prepared. Additive compound and a sintering assistant were added to the ceramic powder. The ceramic powder, the additive compound and the sintering assistant were sufficiently wet-blended and crushed by a ball mill. Thus, the dielectric material was obtained. The side margin material and the cover material were made by the same method. However, the c/a ratio of $BaTiO_3$ had the relationship of "the cover material<the side margin material<the dielectric material".

An organic binder and a solvent were added to the dielectric material. The dielectric green sheet was formed by a doctor blade method. The thickness of the coated dielectric green sheet was 0.8 µm. Polyvinyl butyral (PVB) or the like was used as the organic binder. Ethyl alcohol, toluene or the like was added as the solvent. In addition, plasticizer or the like was added.

Next, an organic binder and a solvent were added to the cover material. The cover sheet was formed by a doctor blade method. Polyvinyl butyral (PVB) or the like was used as the organic binder. Ethyl alcohol, toluene or the like was added as the solvent. In addition, plasticizer or the like was added.

Next, the conductive paste for forming the internal electrode layer was made by a planetary ball mill. The conductive paste included powder of the main component metal (Ni) of the internal electrode layer 12, a co-material (barium titanate), a binder (ethyl cellulose), a solvent and a necessary additive agent. The conductive paste for forming the internal electrode layer was screen-printed on the dielectric green sheet.

250 numbers of the sheets on which the conductive paste was printed were stacked. Cover sheets having a thickness of 30 µm were stacked on a lower face and an upper face of the stacked sheets. After that, a multilayer structure was obtained by a thermo compression bonding. And the resulting multilayer structure was cut into a predetermined shape. Next, the side margin material was made by adding the organic binder and the solvent to the side margin material and coating the resulting side margin material by a doctor blade method. The thickness of the coated side margin sheet was 20 µm. Polyvinyl butyral (PVB) or the like was used as the organic binder. Ethyl alcohol, toluene or the like was added as the solvent. In addition, plasticizer or the like was added. Next, the side margin sheet was affixed to the resulting multilayer structure. The binder was removed in $N_2$ atmosphere. After that, Ni external electrodes were formed on the resulting multilayer structure by a dip method. The resulting multilayer structure was fired at 1250 degrees C. in a reductive atmosphere ($O_2$ partial pressure: $10^{-5}$ to $10^{-8}$ atm). And sintered multilayer structure was formed. A length was 0.6 mm. A width was 0.3 mm. A height was 0.3 mm. The sintered multilayer structure was re-oxidized in a $N_2$ atmosphere at 800 degrees C. After that, metals of Cu, Ni and Sn were coated on a surface of external electrode terminals by plating. And, a multilayer ceramic capacitor was formed. After firing, the thickness of the Ni internal electrode layers 12 was 1.0 µm.

Figure 8A:
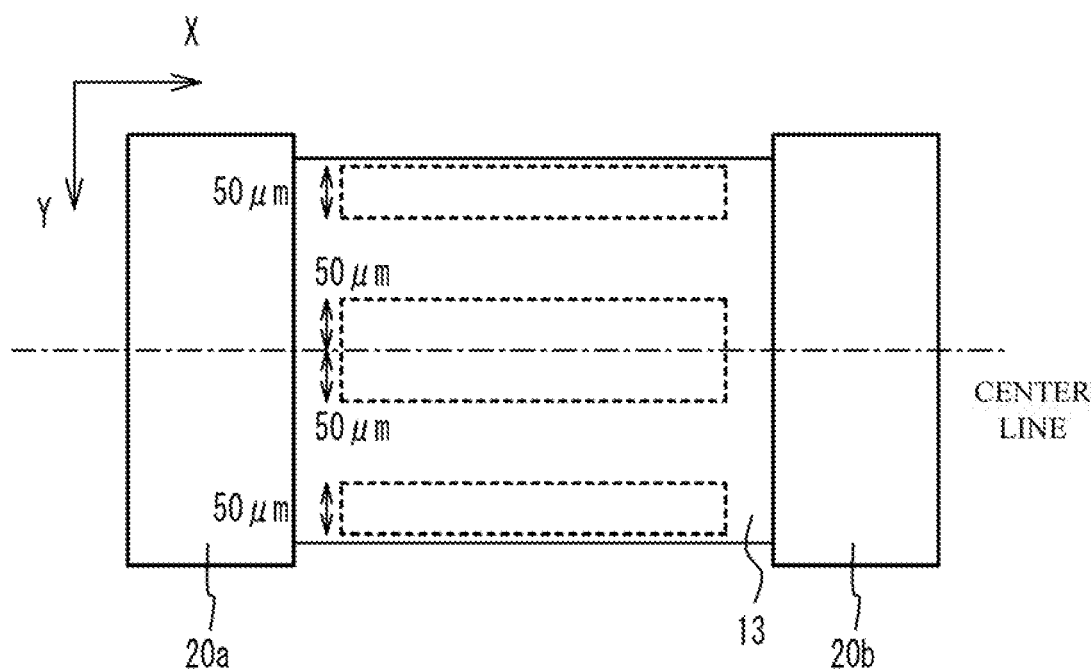
FIG. 8A and FIG. 8B illustrate measured results.
Figure 8B:
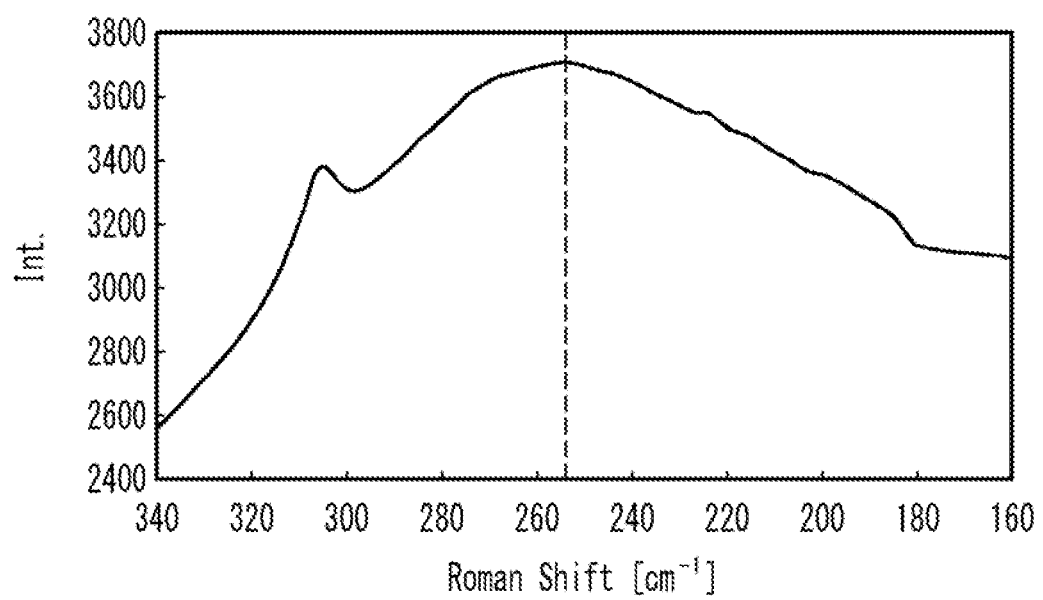
Figure 9:
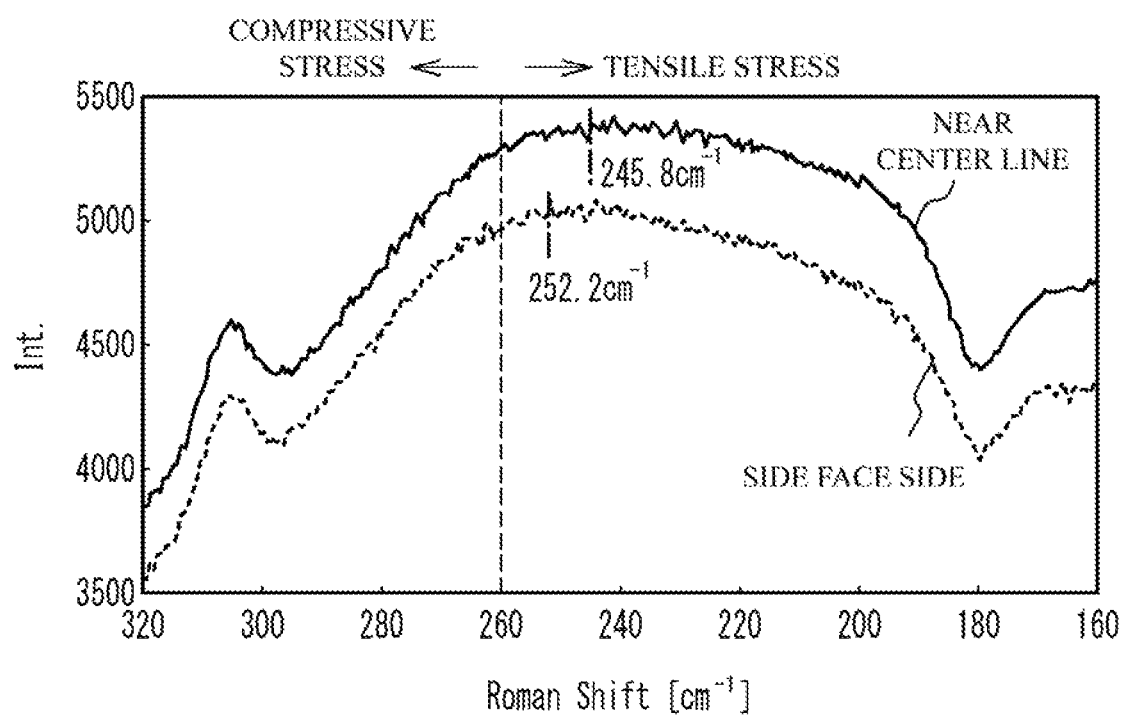
FIG. 9 illustrates an average value of a region near a center line and an average value in a region on a side face side.
Figure 10:
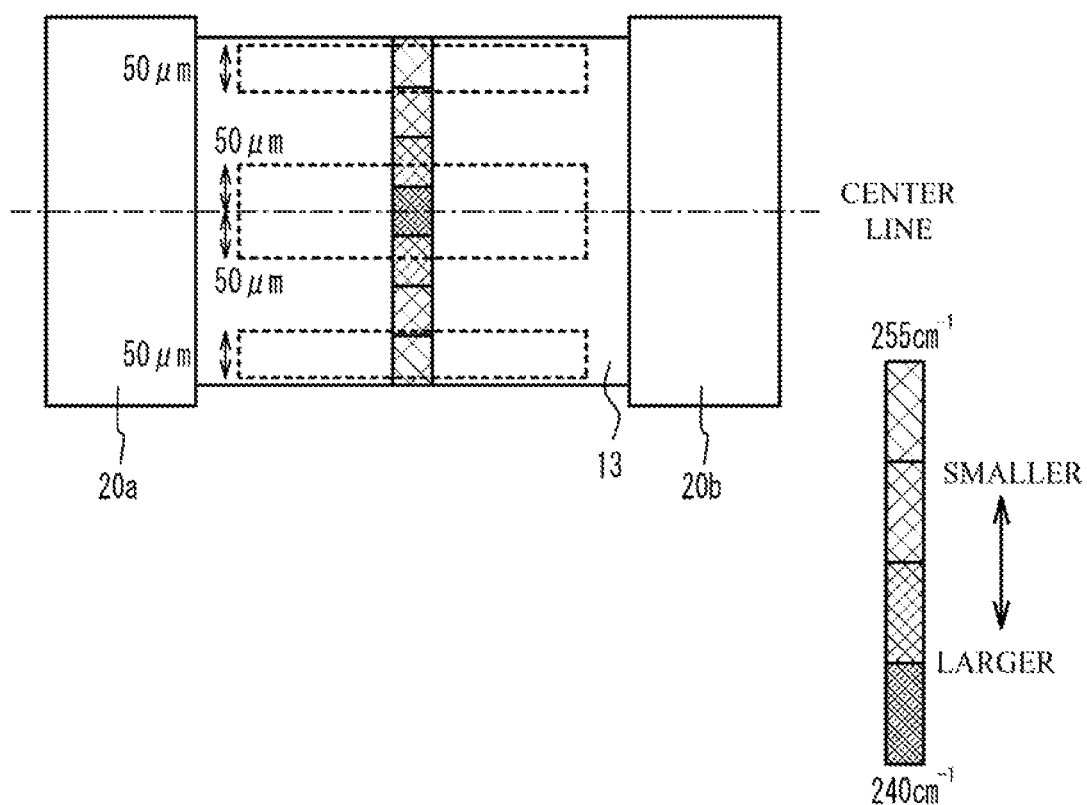
FIG. 10 illustrates measured results between a region near a center line and a region on a side face side.

(Analysis) As illustrated in FIG. 8A, on the surface of the cover layer 13, the X-axis components of the tensile stress of five arbitrary points were measured in each of a region near the center line along the X-axis direction (region within 50 µm from the center line toward the both side face sides) and a region on the side face side (region within 50 µm from the side face toward the center line). In the measured spectra of the five point of each region, as illustrated in FIG. 8B, the number of the waves at the top of the peak caused by the A (1TO) oscillation (the number of the waves on the dotted line in FIG. 8B) were read. And, an average value of the five points was calculated. FIG. 9 illustrates an average value of the region near the center line and an average value in the region on the side face side. As illustrated in FIG. 9, the X-axis component of the tensile stress near the center line is larger the X-axis direction component of the tensile stress of the region on the side face side. FIG. 10 illustrates the measured results between the region near the center line and the region on the side face side. In FIG. 10, when the pattern is denser, the tensile stress is larger. When the pattern is thinner, the tensile stress is smaller. As illustrated in FIG. 10, the X-axis direction component gradually gets smaller from near the center line to the side face side. It is though that this is because the c/a ratio of $BaTiO_3$ has the relationship of "the cover material<the side margin material<the dielectric material".

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
    a multilayer structure having a parallelepiped shape having two end faces, two side faces, an upper face, and a lower face, in which each of a plurality of dielectric layers and each of a plurality of internal electrode layers are alternately stacked, and the plurality of internal electrode layers are alternately exposed to the two end faces of the multilayer structure, a main component of the plurality of dielectric layers being a ceramic; and
    a cover layer provided on at least one of the upper face and the lower face in a stacking direction of the multilayer structure, a main component of the cover layer being same as the main component of the plurality of dielectric layers,
    wherein tensile stress in a first direction remains in an outer surface of the cover layer opposite to an inner surface thereof facing the upper or lower face,
    wherein the first direction is a direction in which the two end faces face each other,
    wherein measurement of the tensile stress in the outer surface of the cover layer is such that the tensile stress in a center region of the outer surface in a second direction is larger than the tensile stress in two regions on side portions of the outer surface closer to the side faces of the multilayer structure, respectively, than is the center region,
    wherein the second direction is a direction in which the two side faces face each other.

2. The multilayer ceramic capacitor as claimed in claim 1, wherein the tensile stress is largest at a center in the outer surface in the second direction passing through a center of the first direction in the outer surface,
wherein the tensile stress in the outer surface of the cover layer gradually gets smaller from the center of the second direction toward the side faces, respectively.

3. The multilayer ceramic capacitor as claimed in claim 2, wherein a difference between a maximum value and a minimum value of the tensile stress is 50 MPa or more, in the second direction passing through the center of the first direction.

4. A manufacturing method of a multilayer ceramic capacitor comprising:
a first process of providing an internal electrode layer pattern of metal conductive paste, on a green sheet including main component ceramic grains;
a second process of providing a cover sheet including main component ceramic grains, on at least one of an upper face and a lower face in a stacking direction of a ceramic multilayer structure in which a plurality of stack units obtained by the first process are stacked so that the internal electrode layer patterns are alternately shifted to each other; and
a third process of providing a discrete side margin sheet on a side face of the ceramic multilayer structure to which the internal electrode layer patterns are exposed, the side margin sheet including main component ceramic grains; and
a fourth process of firing the ceramic multilayer structure and the side margin sheet,
wherein materials of the green sheet, the side margin sheet and the cover sheet are adjusted so that contraction amounts caused by sintering of the firing have a relationship of "the cover sheet>the side margin sheet>the green sheet" with respect to the main component ceramic of the green sheet, the side margin sheet and the cover sheet.

5. The method as claimed in claim 4, wherein c/a ratios have a relationship of "the cover sheet<the side margin sheet<the green sheet" with respect to the main component ceramic of the green sheet, the side margin sheet and the cover sheet.

6. A multilayer ceramic capacitor comprising:
a multilayer structure having a parallelepiped shape having two end faces, two side faces, an upper face, and a lower face, in which each of a plurality of dielectric layers and each of a plurality of internal electrode layers are alternately stacked and are alternately exposed to the two end faces of the multilayer structure, a main component of the plurality of dielectric layers being a ceramic; and
a cover layer provided on at least one of the upper face and the lower face in a stacking direction of the multilayer structure, a main component of the cover layer being same as the main component of the plurality of dielectric layers,
wherein when a laser light which is polarized toward a first direction is radiated to an outer surface of the cover layer opposite to an inner surface thereof facing the upper or lower face, and a spectrum of Raman scattering light is measured in the outer surface of the cover layer, a first peak position of an A oscillation measured in a center region of the outer surface in a second direction is shifted to a minus side with respect to 260 $cm^{-1}$ and a second peak position of an A oscillation measured in a region on a side portion of the outer surface closer to each side face of the multilayer structure, in the second direction, is shifted to a plus side with respect to the first peak position,
wherein the first direction is a direction in which the two end faces face each other,
wherein the second direction is a direction in which the two side faces face each other.

* * * * *